United States Patent [19]

Bussink et al.

[11] 4,267,096

[45] May 12, 1981

[54] COMPOSITION OF A SELECTIVELY HYDROGENATED BLOCK COPOLYMER OF A VINYL AROMATIC COMPOUND AND A DIOLEFIN, A POLYCARBONATE AND AN AMORPHOUS POLYESTER

[75] Inventors: Jan Bussink, Bergen op Zoom; Jean M. H. Heuschen, Halsteren, both of Netherlands

[73] Assignee: General Electric Company, Pittsfield, Mass.

[21] Appl. No.: 93,129

[22] Filed: Nov. 9, 1979

[51] Int. Cl.$^3$ .................. C08L 53/02; C08L 69/00
[52] U.S. Cl. .................. 260/40 R; 525/67; 525/96; 525/439
[58] Field of Search .................. 525/96, 439, 67; 260/40 R

[56] References Cited

U.S. PATENT DOCUMENTS

| | | | |
|---|---|---|---|
| 3,218,372 | 11/1965 | Okamura et al. | 525/439 |
| 3,281,383 | 10/1966 | Zelinski et al. | 260/23.7 |
| 3,333,024 | 7/1967 | Haefele et al. | 260/880 |
| 3,431,224 | 3/1969 | Goldblum | 260/13 |
| 3,753,936 | 8/1973 | Marrs | 260/27 R |
| 4,088,711 | 5/1978 | Gergen et al. | 260/873 |
| 4,090,996 | 5/1978 | Gergen et al. | 260/40 R |

OTHER PUBLICATIONS

Encyclopedia of Pol. Sci. & Tech., vol. 10, pp. 710–764, 1969.

*Primary Examiner*—Carman J. Seccuro
*Attorney, Agent, or Firm*—Morgan, Finnegan, Pine, Foley and Lee

[57] ABSTRACT

There are provided compositions comprising (a) a selectively hydrogenated elastomeric block copolymer, (b) a polycarbonate and (c) an amorphous polyester. The use of the combination of (a) and (c) provides remarkable improvements in the melt flow characteristics, in resistance to brittle failure, and in the resistance to environmental stress crazing and cracking of the polycarbonate resin component (b).

11 Claims, No Drawings

COMPOSITION OF A SELECTIVELY HYDROGENATED BLOCK COPOLYMER OF A VINYL AROMATIC COMPOUND AND A DIOLEFIN, A POLYCARBONATE AND AN AMORPHOUS POLYESTER

This invention relates to novel resin compositions and more particularly, to polymer compositions comprising a selectively hydrogenated elastomeric block copolymer of a vinyl aromatic compound and an olefinic elastomer, an aromatic polycarbonate resin and an amorphous polyester, alone, or in further combination with a reinforcing agent, and/or pigments, stabilizers and the like.

BACKGROUND OF THE INVENTION

Aromatic carbonate polymers are well known, commercially available materials having a variety of applications in the plastics art. Such carbonate polymers may be prepared by reacting a dihydric phenol, such as 2,2-bis(4-hydroxyphenyl)propane, with a carbonate precursor, such as phosgene, in the presence of an acid binding agent. See the Encyclopedia of Polymer Science and Technology, Vol. 10, pp. 710–764, Interscience, New York, 1969, which is incorporated herein by reference. Generally speaking, aromatic polycarbonate resins offer a high resistance to attack by mineral acids, and they are phyiologically harmless as well as stain resistant. In addition, articles molded from such polymers have a high tensile strength and a high impact strength, except in thick sections, a high heat resistance and a dimensional stability far surpassing that of most other thermoplastic material. However, in certain applications, the use of aromatic polycarbonate resins is limited because (i) they have a high viscosity in the melt, making molding of complex, large, and especially foamed parts difficult; (ii) they exhibit brittleness under sharp impact conditions in thick sections and regardless of thickness when small amounts of reinforcements, e.g., glass or pigments, e.g., titanium dioxide, are added for conventional purposes; and (iii) they exhibit severe environmental stress crazing and cracking. The term "environmental stress crazing and cracking" refers to the type of failure which is hastened by the presence of organic solvents, e.g., acetone, heptane and carbon tetrachloride when such solvents are in contact with stressed parts fabricated from aromatic polycarbonate resins. Such contacts may occur, for example, when the solvents are used to clean or degrease stressed parts fabricated from polycarbonates, or when such parts are used in automobiles, especially under the hood.

The relatively high melt viscosities and softening points of aromatic polycarbonates make them difficult to melt process and several approaches have been suggested for improving melt flow, but they have disadvantages. For example, plasticizers can be added but other important properties are lost, the parts becoming brittle and losing a substantial amount of their ability to resist distortion by heat. On the other hand, as is suggested in Goldblum, U.S. Pat. No. 3,431,224, small amounts of polyethylene can be added, and, while this markedly enhances resistance to environmental stress cracking, low levels of polyethylene are not too effective to enhance melt flow and an increase into effective ranges tends to result in molded articles which delaminate.

In co-pending, commonly-assigned application Ser. No. 833,364, pending in Group 140 it is reported that the addition of a minor amount of a hydrogenated block copolymer to aromatic polycarbonates causes the melt viscosity to go way down, but the heat distortion temperature is substantially unaffected. It is further reported that adding hydrogenated block copolymers to polycarbonates leads to improvement in impact resistance in thick-walled molded articles. A third major advantage reported after adding hydrogenated block copolymers to polycarbonates is to improve their environment resistance. Thus, the molded parts can be subjected to more strain before cracking starts, without appreciably affecting any other of their desirable properties.

Compositions comprising linear block copolymers of the A-B-A type and aromatic polycarbonates are also described in Gergen et al., U.S. Pat. No. 4,088,711. In Gergen et al., U.S. Pat. No. 4,090,996, there are described such compositions which also include a saturated thermoplastic polyester which is further characterized as having a generally crystalline structure and a melting point over about 120° C.

The present invention is a departure from and an improvement over the above-mentioned patents and application, in which the components are intimately admixed in carefully selected ratios and there is used an amorphous, instead of crystalline, saturated thermoplastic polyester component.

The compositions contemplated by the present invention are restricted to those within the following network; the selectively hydrogenated block copolymer (A-B-A as well as radial teleblock), 0.1–6 pbw, preferably 1–4 pbw; aromatic polycarbonate 65–97.5 pbw, preferably 76–88 pbw; and amorphous saturated thermoplastic polyester resin, 1–30 pbw, preferably 10–20 pbw.

The data in the above-mentioned U.S. Pat. No. 4,090,996 indicates the need to use relatively high loadings of A-B-A block copolymers together with a high ratio of crystalline polyester to polycarbonate (greater than 1:1 polyester to polycarbonate). At lower loadings of A-B-A block copolymers, it has been found that high ratio crystalline polyester-polycarbonate blends are almost impossible to extrude without unacceptable die swell, etc. The problem with using higher loadings of A-B-A block copolymers, instead of 6% or less herein, however, is loss of mechanical properties such as creep, tensile modulus and deflection temperature under load. To solve the processability and property loss problems, applicants herein control the polyester content to lower levels of up to 30%, but preferably 20%, i.e., the ratio of polyester to polycarbonate is less than 1:1 and they use an amorphous polyester instead of the crystalline polyester of the prior art composition. This permits the block copolymers to be added, not only as processing aids, but also to improve stress crack resistance, cold temperature impact strength, and for achieving a more predictable ductile-brittle (DB) impact transition. Such objects and advantages are in no way suggested by U.S. Pat. No. 4,090,996. Moreover, the use of the amorphous polyester provides the improved properties of the compositions.

The new compositions may also be reinforced, e.g., with fibrous glass, and rendered flame retardant either by using a halogenated aromatic polycarbonate as all or part of component (b), and/or by using flame retardant additives, or they may be pigmented, and/or foamed by known procedures to extend their field of use in melt processed products.

In comparison with the compositions of prior art, they will in general, also have high stiffness and strength, excellent surface appearance, and excellent resistance to discoloration by heat.

DESCRIPTION OF THE INVENTION

According to the present invention, there are provided high impact strength thermoplastic compositions comprising an intimate blend of:
 (a) from about 0.1 to about 6 parts by weight of a selectively hydrogenated linear, sequential or radial teleblock copolymer of a vinyl aromatic compound $(A)_n$ and $(A)_n^1$ and an olefinic elastomer (B), of the $A-B-A^1$; $A-(B-A-B)_n-A$; $A(BA)_nB$; $(A)_4B$; $B(A)_4$; or $B[(AB)_nB]_4$ type, wherein n is an integer of from 1 to 10;
 (b) from about 65 to about 97.5 parts by weight of an aromatic polycarbonate resin; and
 (c) from about 1 to about 30 parts by weight of an essentially amorphous polyester resin.

Preferred compositions will be those in which component (a) comprises from 1 to 4 parts by weight, component (b) comprises from 76–88 parts by weight and component (c) comprises from 10 to 20 parts by weight per 100 parts by weight of the total weight of components (a), (b) and (c).

With respect to component (a), the hydrogenated block copolymers are made by means known in the art and they are commercially available.

Prior to hydrogenation, the end blocks of these copolymers comprise homopolymers or copolymers preferably prepared from alkenyl aromatic hydrocarbons and particularly vinyl aromatic hydrocarbons wherein the aromatic moiety may be either monocyclic or polycyclic. Typical monomers include styrene, alpha methyl styrene, vinyl xylene, ethyl vinyl xylene, vinyl naphthalene, and the like, or mixtures thereof. The end blocks (A) and $(A^1)$, may be the same or different. They are preferably selected from styrene, α-methyl styrene, vinyl toluene, vinyl xylene, vinyl naphthalene, especially styrene. The center block (B) may be derived from, for example, butadiene, isoprene, 1,3-entadiene, 2,3,dimethyl butadiene, and the like, and it may have a linear, sequential or teleradial structure.

The selectively hydrogenated linear block copolymers are described by Haefele et al, U.S. Pat. No. 3,333,024, which is incorporated herein by reference.

The ratio of the copolymers and the average molecular weights can vary broadly although the molecular weight of center block should be greater than that of the combined terminal blocks. It is preferred to form terminal blocks A having average molecular weights of 2,000 to 100,000 and center block B, e.g., a hydrogenated polybutadiene block with an average molecular weight of 25,000 to 1,000,000. Still more preferably, the terminal blocks have average molecular weights of 8,000 to 60,000 while the hydrogenated polybutadiene polymer blocks has an average molecular weight between 50,000 and 300,000. The terminal blocks will preferably comprise 2 to 60% by weight, or more, preferably, 15 to 40% by weight, of the total block polymer. The preferred copolymers will be those formed from a copolymer having a hydrogenated/saturated polybutadiene center block wherein 5 to 55%, or more, preferably, 30 to 50% of the butadiene carbon atoms, are vinyl side chains.

The hydrogenated copolymers will have the average unsaturation reduced to less than 20% of the original value. It is preferred to have the unsaturation of the center block B reduced to 10%, or less, preferably, 5% of its original value.

The block copolymers are formed by techniques well known to those skilled in the art. Hydrogenation may be conducted utilizing a variety of hydrogenation catalysts such as nickel on kieselguhr, Raney nickel, copper chromate, molybdenum sulfide and finely divided platinum or other noble metals on a low surface area carrier.

Hydrogenation may be conducted at any desired temperature or pressure, from atmospheric to 300 psig, the usual range being between 100 and 1,000 psig at temperatures from 75° F. to 600° F. for times between 0.1 and 24 hours, preferably, from 0.2 to 8 hours.

Hydrogenated block copolymers such as Kraton G-6500, Kraton G-6521, Kraton G-1650 and Kraton G-1652 from Shell Chemical Company, Polymers Division, have been found useable according to the present invention. Kraton G-1650 and Kraton G-1651 are preferred. Also usable are the so-called hydrogenated Solprenese of Phillips, especially the product designated Solprene-512.

The radial teleblock copolymers of which the Solprenes are typical examples can be characterized as having at least three polymer branches with each branch of the radial block polymer comprising terminal non-elastomeric segments, e.g. (A) and $(A^1)$ as defined hereinabove. The branches of the radial block polymer contain a terminal non-elastomeric segment attached to an elastomeric polymer segment, e.g. (B) as defined above. These are described in Marrs, U.S. Pat. No. 3,753,936 and in Zelinski, U.S. Pat. No. 3,281,383, both of which are incorporated herein by reference, and they are selectively hydrogenated by procedures known per se. In any event, the term "selective hydrogenation" is used herein to contemplate polymers in which the elastomeric blocks (B) have been hydrogenated, but the non-elastomeric blocks (A) and $(A^1)$ have been left unhydrogenated, i.e., aromatic.

In preferred compositions, the aromatic polycarbonate component (b) will be an aromatic polycarbonate of a dihydric phenol and a carbonate precursor such as phosgene, a haloformate or a carbonate ester. Generally speaking, such carbonate polymers may be typified as possessing recurring structural units of the formula

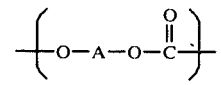

wherein A is a divalent aromatic radical of the dihydric phenol employed in the polymer producing reaction. Preferably, the carbonate polymers used to provide the resinous component (b) have an intrinsic viscosity (as measured in p-dioxane in deciliters per gram at 30° C.) ranging from about 0.35 to about 0.75. The dihydric phenols which may be employed to provide such aromatic polycarbonate polymers are mononuclear and polynuclear aromatic compounds, containing as functional groups, 2 hydroxyl radicals, each of which is attached directly to a carbon atom of an aromatic nucleus. Illustrative dihydric phenols are 2,2-bis (4-hydroxyphenyl)propane (Bisphenol-A); hydroquinone; resorcinol; 2,2-bis-(4-hydroxyphenyl)pentane; 2,4'-dihydroxydiphenyl methane; bis-(2-hydroxyphenyl)methane; bis-(4-hydroxyphenyl)methane; bis-(4-hydroxy-5-nitrophenyl)methane; 1,1-bis-(4-hydroxyphenyl)ethane; 3,3-bis -(4-hydroxyphenyl)pentane; 2,2'-dihydroxy-diphenyl; 2,6-dihydroxy naphthalene; bis-(4-hydroxyphenyl sulfone);2,4'-dihydroxy-diphenyl)sulfone; 5'-chloro-2,4'-dihydroxydiphenyl sulfone;bis-(4-hydroxyphenyl)diphenyl sulfone; 4,4'-dihydroxydiphenyl ether; 4,4'-dihydroxy-3,3'-dichlorodiphenyl ether; 4,4'-dihydroxy-2,5-diethoxydiphenyl ether; 2,2-bis-(3,5-dichloro-4-hydroxyphenyl)propane; 2,2-bis-(3,5-dibromo-4-hydroxyphenyl)propane; 2,2-bis-(3,5-dimethyl-4-hydroxy phenyl)propane; and the like.

A variety of additional dihydric phenols which may be employed to provide such carbonate polymers are disclosed in Goldberg, U.S. Pat. No. 2,999,835. It is, of course, known to employ two or more different dihydric phenols or a dihydric phenol in combination with a glycol, a hydroxy terminated polyester, or a dibasic acid in the event that a carbonate copolymer rather than a homopolymer, e.g., bisphenol A and tetrabromobisphenol A with flame retardant properties, is desired for use as component (a) in the compositions of this invention.

When a carbonate ester is used as the carbonate precursor in the polymer forming reaction, the materials are reacted at temperatures of from 100° C. or higher for times varying from 1 to 15 hours. Under such conditions, ester interchange occurs between the carbonate ester and the dihydric phenol used. The ester interchange is advantageously consummated at reduced pressures of the order of from about 10 to about 100 mm. of mercury, preferably in an inert atmosphere, such as nitrogen or argon, for example.

The carbonate ester useful in this connection may be aliphatic or aromatic in nature, although aromatic esters, such as diphenyl carbonate, are preferred. Additional examples of carbonate esters which may be used are dimethyl carbonate, diethyl carbonate, phenylmethyl carbonate, phenyltolyl carbonate and di(tolyl) carbonate.

Generally speaking, a haloformate such as the bishaloformate of 2,2-bis-(4-hydroxyphenyl)-propane may be substituted for phosgene as the carbonate precursor in any of the methods described above.

In each of the above solution methods of preparation, the carbonate polymer emerges from the reaction in either a true or pseudo solution whether aqueous base or pyridine is used as an acid acceptor. The polymer may be precipitated from the solution by adding a polymer non-solvent, such as heptane or isopropanol. Alternatively, the polymer solution may be heated to evaporate the solvent.

The essentially amorphous polyester component (c) will be thermoplastic and made by procedures well known to those skilled in this art. In contrast, the poly(alkylene terephthalates) of most widespread use commercially have a generally crystalline structure. The latter do not perform suitably in the instant compositions. As will be shown hereinafter, generally crystalline polyesters when blended with polycarbonate and the block copolymer in the weight ratios set forth above are difficult to extrude, exhibiting extreme die swell, undesirable fiber spinning when stranding, and show delamination (flow lines). Analysis of granulates shown a fluctuation in the polyester/polycarbonate ratio from the core outwardly to the skin.

Amorphous poly(alkylene terephthalates), on the other hand, which are made to have a low tendency to crystallize, give, with polycarbonates and block copolymers, compositions which provide smooth extrusions, and easy stranding, without excessive die swell.

The use of amorphous poly(alkylene terephthalates) permits the use of articles made from those blends at temperatures far above the glass transition temperature of the crystalline polyesters without loss in important properties.

In general, the amorphous polyesters will comprise the reaction product of an alkylene glycol, e.g. or glycols of from 2 to 10 carbon atoms, and a dicarboxylic acid, preferably aromatic in nature, and especially preferably a terephthalic or isophthalic acid, or reactive derivative thereof. The glycol can be selected from ethylene glycol, propylene glycol, 1,4-butanediol, 1,4-cyclohexane dimethanol, 1,10-decamethylene glycol, and the like. Although scrupulous freedom from nucleating agents provides poly(ethylene terephthalate) with a low degree of crystallinity, it is preferred to prepare or use copolyesters of the poly(alkylene terephthalate) type (99/.5%–94)% which contain, incorporated at random in the chain, small amounts of dissimilar units (0.5–5)% in order to break down any tendency whatever for the "100%" pure polyester to crystallize. The use of a small amount of isophthalic acid instead of terephthalic acid 100% will also produce amorphous-polyesters. The predominant polymer can be made from a single one of ethylene glycol, 1,4-butanediol, 1,4-cyclohexanedimethanol, and the like, and the minor amount of second glycol can comprise a different one of the three enumerated or propylene glycol, 1,6-hexanediol, and the like. Preferably, the polyester will be an amorphous poly(ethylene terephthalate) copolyester, an amorphous poly(1,4-butylene terephthalate) copolyester; or an amorphous poly(1,4-cyclohexane dimethylene terephthalate) copolyester. Especially preferred is an amorphous poly(ethylene terephthalate). One suitable form is available from Akzo Industries under the trade designation ARNITE A04-102.

As is mentioned above, other additives may be present in the compositions, such as pigments, e.g., titanium dioxide. Also flame retardants, foaming agents, e.g., 5-phenyltetrazole, etc., and the like, all present in amounts varying between about 0.1 and 100 parts by weight of the total resinous components (a), (b) and (c) in the composition.

Among the preferred features of this invention are reinforced compositions containing reinforcing amounts of reinforcements, such as powders, whiskers, fibers or platelets of metals, e.g., aluminum, bronze, iron or nickel, and non-metals, e.g., carbon filaments, acicular $CaSiO_3$, asbestos, $TiO_2$, titanate whiskers, glass flakes, and the like. Such reinforcements will be present in an amount of, e.g., 2 to 60% by weight, preferably 5 to 40% by weight. Especially preferred as a reinforcement is fibrous glass.

There can also be added stabilizers, such as phosphites, phosphates, epoxides, and the like, either in combination or individually, depending on the end use.

The method of forming the polymer composition is not critical. Any prior art blending technique is generally suitable. The preferred method comprises blending the polymers and additives, such as reinforcements in powder, granular and filamentous form—as the case may be—extruding the blend and chopping into pellets suitable for molding to shape by means conventionally used to mold normally solid thermoplastic compositions.

DESCRIPTION OF THE PREFERRED EMBODIMENTS

The advantages obtained by providing compositions of a selectively hydrogenated elastomeric vinyl aromatic olefinic A-B-A block copolymer, an aromatic polycarbonate resin and an amorphous polyester are illustrated in the following examples which are set fourth as further description of the invention, but are not to be construed as limiting the invention thereto.

The following formulations are produced by a general procedure comprising mechanically blending the components, predrying then extruding them in an extruder at 260°–320° C. After extrusion the materials are dried for 2 hours at 125° C., before molding into test pieces in a reciprocating screw injection molding machine at 260° to 320° C. (cylinder) and 50° to 100° C. (mold). All of the polycarbonate components contain a small amount, e.g., 0.1% of a stabilizer combination, i.e., conventional phosphite/hindered phenol. The physical tests are carried out by the following procedures: notched Izod impact strength on $\frac{1}{8}''$ specimens; falling dart impact tests on $\frac{1}{8}''$ disc specimens; tensile strength and modulus, flexural strength and modulus; heat distortion temperature and apparent melt viscosity at 1500 sec.$^{-1}$ and 300° C., and Charpy impact.

Stress cracking resistance is measured in a test jig: $\frac{1}{8}''$ tensile test bars are immersed in super gasoline or carbon tetrachloride under 0.3% strain. Time to break is measured.

EXAMPLES 1–2

Compositions comprising a selectively hydrogenated block copolymer of styrene-butadiene-styrene, aromatic carbonate of bisphenol-A and phosgene, amorphous poly(ethylene terephthalate) and a pigment, TiO$_2$, are prepared, molded and tested. For comparison purposes, compositions with a crystalline poly(ethylene terephthalate) are also prepared and tested. The compositions and properties are summarized in Table 1:

TABLE 1

Compositions Comprising Block Copolymer, Polycarbonate and Amorphous Polyester

| Example | 1 | 1A* | 2 | 2A* |
|---|---|---|---|---|
| Composition (parts by weight) | | | | |
| (a) hydrogenated styrene-butadiene-styrene block copolymer[a] | 2 | 2 | 2 | 2 |
| (b) poly-(2,2-diphenylpropane) carbonate[b] | 86 | 86 | 81 | 81 |
| (c) amorphous poly(ethylene terephthalate)[c] | 10 | — | 15 | — |
| (c') crystalline poly(ethylene terephthalate)[d] | — | 10 | — | 15 |
| (d) pigment, TiO$_2$ | 2 | 2 | 2 | 2 |
| Properties | | | | |
| Izod impact, ft.lbs./in.notch | | | | |
| 23° C. | 14 | 2.9 | 13.5 | 2.4 |
| −10° C. | 3.2 | 2.0 | 2.7 | 1.6 |
| Tensile modulus, psi × 10$^5$ | 3.25 | 3.30 | 3.20 | 3.30 |
| Tensile strength, psi × 10$^3$ | | | | |
| 0.5 cm./min. | 8.5 | 8.7 | 8.4 | 8.7 |
| 50 cm./min. | 9.2 | 9.0 | 9.2 | 8.4 |
| Elongation at break, % | 70 | 5.8 | 85 | 4.5 |
| UV resistance, ΔE after 100 hrs. in sun test | 0.6 | >5 | 0.8 | >5 |
| Color | perfect white | yellow-green tint | perfect white | yellow-green tint |

*Control
[a]Shell Chemical Co., Kraton G 1650
[b]General Electric Co., LEXAN, medium molecular weight
[c]AKZO, Arnite A04-102, amorphous, IV of 1.1 dl./g. in phenol-tetrachloroethane (60:40) at 30° C.
[d]Melting point 255° C., IV of .64 dl./g. in phenol-tetrachloroethane (60:40) at 30° C.

During processing, the blends with the amorphous poly(ethylene terephthalate) (Examples 1 and 2) give a smooth extrusion and easy stranding (no excessive die swell). There is respectively, a 14% and a 17% increase in apparent melt viscosity after 40 minutes of mixing at 300° C.

In contrast, the blends with the crystalline poly(ethylene terephthalate) (Controls 1A and 2A), are difficult to extrude, showing extreme die swell and fiber spinning when stranding. Analysis of granulates shows a fluctuation in the PET/PC ratio from core to skin, indicating a very poor mixing. For 2A, values up to 22% PET in the skin an only 8% in the core are measured. Melt stability is poor, there being a 24% and a 28% increase in apparent melt viscosity after 40 minutes of mixing at 300° C., and heavy degradation is observed upon processing at 280° C.

It is seen from the data in the Table that impact strengths and thermal stability, as well as processability, are markedly improved with the compositions of this invention.

EXAMPLES 3–12

The general procedure of Examples 1–2 is used to prepare further compositions according to this invention, in which two different block copolymers are used. Some compositions contain pigment; some do not. For comparison purposes, moldings are made and tested from polycarbonate, alone; polycarbonate and amorphous polyester, alone; and amorphous polyester alone. The formulations and the properties obtained are summarized in Table 2:

TABLE 2

Compositions Comprising Block Copolymer, Aromatic Polycarbonate and Amorphous Polyester

| Example | 3A* | 3B* | 3C* | 3 | 4 | 5 | 6 | 7 | 8 | 9 | 10 | 11 | 12 |
|---|---|---|---|---|---|---|---|---|---|---|---|---|---|
| Composition (Parts by Weight) | | | | | | | | | | | | | |
| (a) hydrogenated styrene-butadiene-styrene block copolymer[a] | — | — | — | 2 | 2 | 2 | — | — | — | 2 | 2 | 2 | 2 |
| (a') hydrogenated styrene-butadiene-styrene block copolymer[a'] | — | — | — | — | — | — | 2 | 2 | 2 | — | — | — | — |
| (b) poly (2,2-diphenylpropane)carbonate[b] | 98 | 88 | — | 88 | 83 | 78 | 88 | 83 | 78 | 86 | 81 | 76 | 71 |
| (c) amorphous poly(ethylene terephthalate)[c] | — | 10 | 100 | 10 | 15 | 20 | 10 | 15 | 20 | 10 | 15 | 20 | 25 |
| (d) pigment, TiO$_2$ | 2 | 2 | — | — | — | — | — | — | — | 2 | 2 | 2 | 2 |
| Properties | | | | | | | | | | | | | |
| Izod Impact, ft.lbs./in. notch | | | | | | | | | | | | | |

TABLE 2-continued

| | Compositions Comprising Block Copolymer, Aromatic Polycarbonate and Amorphous Polyester | | | | | | | | | | | | | | |
|---|---|---|---|---|---|---|---|---|---|---|---|---|
| Example | 3A* | 3B* | 3C* | 3 | 4 | 5 | 6 | 7 | 8 | 9 | 10 | 11 | 12 |
| 23° C. | 13.8 | 2.6 | 0.4 | 13.4 | 14.3 | 13.4 | 14.2 | 15.3 | 15.3 | 14.1 | 13.5 | 13.0 | 3.2 |
| −10° C. | 3.3 | 2.3 | — | 2.9 | 2.2 | 4.1 | 4.1 | 3.0 | 2.6 | 3.2 | 2.7 | 2.4 | 2.3 |
| Tensile modulus, psi × 10⁵ | 3.5 | 3.4 | 3.2 | 3.24 | 3.25 | 3.2 | 3.25 | 3.2 | 3.1 | 3.2 | 3.2 | 3.19 | 3.2 |
| Tensile strength, psi × 10³ | | | | | | | | | | | | | |
| 0.5 cm./min. | 8.7 | 8.7 | 8 | 8.4 | 8.2 | 8.2 | 8.3 | 8.2 | 8.1 | 8.5 | 8.4 | 8.2 | 8.0 |
| 50 cm./min. | 9.3 | 9.4 | — | 9.4 | 8.9 | 8 | 9.0 | 9.1 | 9.0 | 9.2 | 8.0 | 9.0 | 8.8 |
| Elongation at break, % | 165 | 90 | 300 | 180 | 205 | 220 | 195 | 200 | 180 | 170 | 185 | 195 | 200 |
| Ductile/brittle transition temp., °C. | 0 | 26 | — | 2 | 6 | 11 | 0 | 3 | 7 | 6 | 10 | 15 | 25 |
| Heat distortion temp., °C. @ 266 psi | 135.5 | 134 | 73 | 135 | 133.5 | 133 | 134 | 133 | 132 | 133 | 132 | 132 | 131 |

*Control
ᵃShell Chemical, Kraton G 1650
ᵈShell Chemical, Kraton G 1651
ᵇGeneral Electric Co., LEXAN, low viscosity
ᶜAKZO, Arnite A 04-102

The following observations are made during processing: At very low levels of amorphous polyester (PET), the viscosity of the blend is slightly increased toward pure aromatic polycarbonate (PC), regardless of the viscosity of the PET. Above 50% PET, the viscosity decreases proportionally to the initial viscosity of the PC. Low levels of addition of the block copolymer markedly improves the flow of the blend. Furthermore, all blends (according to this invention) containing block copolymer show little die swell and excellent extrudability, in comparison with the pure PC/PET blends (e.g., 3B).

With respect to the physical property data, all compositions of this invention exhibit heat distortion temperatures (HDT) above 131° C., dispite the different structures of the three resins involved, and also the very low HDT of PET (73° C.) and of the block copolymer (∼ −60° C.). The tensile strengths are at least equal to that of PET, there is high ductility in tensile testing (ductile above 50 cm./min. drawing rate). Elongation at break is high, and, despite a low impact for PET alone, in the compositions of this invention good notched Izod impact strengths are shown even at low temperatures.

EXAMPLES 13–16

The general procedure of Examples 1-2 is repeated and glass reinforced compositions according to this invention are prepared, molded and tested. The formulations and properties are summarized in Table 3:

TABLE 3

| Glass Reinforced Compositions Comprising Block Copolymer, Polycarbonate and Amorphous Polyester | | | | |
|---|---|---|---|---|
| Example | 13 | 14 | 15 | 16 |
| Composition (Parts by Weight) | | | | |
| (a) hydrogenated block copolymer of styrene-butadiene-styreneᵃ | 2 | 2 | 2 | 2 |
| (b) poly(2,2-diphenyl propane) carbonateᵇ | 78* | 73* | 78** | 73** |
| (c) amorphous poly(ethylene terephthalate)ᶜ | 10 | 15 | 10 | 15 |
| (d) pigment, TiO₂ | 1 | 1 | 1 | 1 |
| (e) fibrous glass reinforcement | 9 | 9 | 9 | 9 |
| Properties | | | | |
| Izod impact strength, ft.lbs./in. notch | 4.7 | 4.4 | 3.5 | 2.2 |
| Falling dart impact strength | 150 | 130 | 120 | 125 |
| Tensile modulus, psi × 10⁵ | 4.15 | 4.15 | 4.07 | 3.94 |
| Flexural modulus, psi × 10⁵ | 4.46 | 4.46 | 4.45 | 4.25 |
| Tensile strength, psi × 10³ | 8.1 | 8.1 | 8.1 | 8.2 |
| Flexural strength, psi × 10³ | 13.9 | 13.9 | 13.8 | 13.8 |
| Heat distortion temp., °C., @ 266 psi | 135 | 135 | 135 | 134 |

ᵃShell Chemical, Kraton G
ᵇGeneral Electric Co., LEXAN; *105; **125.
ᶜAKZO, Arnite A 04-102.

EXAMPLES 17–20

A series of compositions are prepared and molded, and the environmental stress cracking is determined in tensile test bars under flexural load with 0.3% strain after immersion in carbon tetrachloride and gasoline (40% aromatics content). The results are summarized in Table 4:

TABLE 4

| Stress Cracking of Compositions Comprising Block Copolymer, Polycarbonate and Amorphous Polyester | | | | | | |
|---|---|---|---|---|---|---|
| Example | 17A* | 17 | 18 | 19A* | 19 | 20 |
| Composition (Parts by Weight) | | | | | | |
| (a) hydrogenated block copolymer of styrene-butadiene-styreneᵃ | — | 2 | 2 | — | 2 | 2 |
| (b) poly(2,2-diphenyl-propane) carbonateᵇ | 85 | 83 | 81 | 80 | 78 | 76 |
| (c) amorphous poly-(ethylene terephthalate)ᶜ | 15 | 15 | 15 | 20 | 20 | 20 |
| (d) pigment, TiO₂ | — | — | 2 | — | — | 2 |
| Observations: | | | | | | |
| In carbon tetrachloride Catastrophic Failure after: | 9 min. | +40 hrs.ᵈ | +20 hrs. | 2½ min. | 40 hrs.ᵉ | +20 hrs. |
| In gasoline Catastrophic Failure after: | 4½ hrs. | +46 hrs.ᵉ | +20 hrs. | 9 hrs. | +46 hrs.ᶠ | +20 hrs. |

*Control
ᵃShell Chemical Co., Kraton G 1650
ᵇGeneral Electric Co., LEXAN
ᶜAkZO, Arnite A 04-102
ᵈlot of crazes;
ᵉfew crazed;
ᶠno crazed In contrast to unmodified polycarbonate, which breaks after a few seconds in both solvents, compositions containing a minimum of 15% amorphous poly(ethylene terephthalate) and 2% Kraton G 1650 block copolymer have a critical strain above 0.3% in both CCl₄ and gasoline. Pigments appear to have an enhancing effect on stress cracking resistance.

EXAMPLES 21-27

The general procedure of Examples 1 and 2 is used to prepare the following compositions within the scope of this invention:

| Example | 21 | 22 | 23 | 24 | 25 | 26 | 27 | 27A* | 27B* | 27C* |
|---|---|---|---|---|---|---|---|---|---|---|
| Composition (Parts by Weight) | | | | | | | | | | |
| (a) hydrogenated A-B-A block copolymer of styrene-butadiene-styrene | 0.5 | 3.8 | 5 | 5 | — | 2 | 2 | 2 | 10 | 5 |
| (a') hydrogenated radial block copolymer of styrene-butadiene-styrene | — | — | — | — | 2 | — | — | — | — | — |
| (b) poly(2,2-diphenylpropane) carbonate | 84.5 | 81.2 | 80 | 65 | 85 | 85 | 85 | 85 | 75 | 55 |
| (c) amorphous poly(ethylne terephthalate) | 15 | 15 | 15 | 30 | 15 | — | — | — | 15 | 40 |
| (c') amorphous poly(1,4-cyclohexanedimethylene terephthalate) | — | — | — | — | — | 15 | — | — | — | — |
| (c") amorphous poly(1,4-butylene terephthalate) | — | — | — | — | — | — | 15 | — | — | — |
| (c''') crystalline poly(1,4-butylene terephthalate) | — | — | — | — | — | — | — | 15 | — | — |

*Control -- to show that this material does not provide goodprocessability and properties.

Obviously, other modifications and variations of the present invention are possible in light of the above teachings. For example, flame retardant agents and foaming agents of a conventional type can be included in conventional amounts. It is, therefore, to be understood that changes may be made in the particular embodiments of the invention described which are within the full intended scope of the invention as defined by the appended claims.

We claim:

1. A thermoplastic composition comprising an intimate blend of:
    (a) from about 0.1 to about 6 parts by weight of a selectively hydrogenated linear, sequential or radial teleblock copolymer of a vinyl aromatic compound $(A)_n$ and $(A)_n^1$ and a diolefin (B), of the A-B-A$^1$; A-(B-A-B)$_n$-A; A(BA)$_n$B; (A)$_4$B; B(A)$_4$; or B[(AB)$_n$B]$_4$ type, wherein n is an integer of from 1 to 10;
    (b) from about 65 to about 97.5 parts by weight of an aromatic polycarbonate resin; and
    (c) from about 1 to about 30 parts by weight of an essentially amorphous polyester resin.

2. A composition as defined in claim 1 wherein component (a) comprises from 1 to 4 parts by weight, component (b) comprises from 76 to 88 parts by weight and component (c) comprises from 10 to 20 parts by weight of the total weight of components (a), (b) and (c).

3. A composition as defined in claim 1 wherein, in component (a), (A) and (A)$^1$ are selected from styrene, α-methyl styrene, vinyl toluene, vinyl xylene and vinyl naphthalene and (B) is selected from butadiene, isoprene, 1,3-pentadiene or 2,3-dimethylbutadiene.

4. A composition as defined in claim 3 wherein, in component (a), (A) is a styrene block, (B) is a diolefin block, and (A)$^1$ is a styrene block.

5. A composition as defined in claim 4 wherein, in component (a), terminal blocks (A) and (A)$^1$ have molecular weights of 2,000 to 100,000, respectively, and center block (B) has a molecular weight of from 25,000 to 1,000,000.

6. A composition as defined in claim 1 wherein component (b) is an aromatic polycarbonate of a dihydric phenol and a carbonate precursor.

7. A composition as defined in claim 6 wherein said aromatic polycarbonate is a polycarbonate of bisphenol-A.

8. A composition as defined in claim 1 wherein said component (c) is an essentially amorphous poly(ethylene terephthalate).

9. A reinforced composition as defined in claim 1 including a reinforcing amount of a reinforcing filler.

10. A composition as defined in claim 9 wherein the reinforcing agent comprises glass fibers.

11. A composition as defined in claim 1 which also includes a small, effective amount of a pigment.

* * * * *

UNITED STATES PATENT AND TRADEMARK OFFICE
CERTIFICATE OF CORRECTION

PATENT NO. : 4,267,096

DATED : May 12, 1981

INVENTOR(S) : Jan Bussink
Jean M.H. Heuschen

It is certified that error appears in the above-identified patent and that said Letters Patent are hereby corrected as shown below:

Column 9, line 29 -- sweel -- should be -- swell --

IN THE CLAIMS

Part of claim 2 and all of claim three is missing. Should read -- 2. A composition as defined in Claim 1 wherein component (a) comprises from 1 to 4 parts by weight, component (b) comprises from 76 to 88 parts by weight and component (c) comprises from 10 to 20 parts by weight of the total weight of components (a), (b) and (c). --

3. A composition as defined in Claim 1 wherein, in component (a), (A) and (A)$^1$ are selected from styrene, α-methyl styrene, vinyl toluene, vinyl xylene and vinyl naphthalene and (B) is selected from butadiene, isoprene, 1,3-pentadiene or 2,3-dimethylbutadiene. --

Signed and Sealed this

Fifth Day of October 1982

[SEAL]

Attest:

GERALD J. MOSSINGHOFF

Attesting Officer

Commissioner of Patents and Trademarks